(12) United States Patent
Corten

(10) Patent No.: US 6,910,867 B2
(45) Date of Patent: Jun. 28, 2005

(54) BLADE OF A WIND TURBINE

(75) Inventor: Gustave Paul Corten, Alkmaar (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

(21) Appl. No.: 10/312,738

(22) PCT Filed: Jun. 28, 2001

(86) PCT No.: PCT/NL01/00483

§ 371 (c)(1),
(2), (4) Date: Jul. 25, 2003

(87) PCT Pub. No.: WO02/08600

PCT Pub. Date: Jan. 31, 2002

(65) Prior Publication Data

US 2004/0013512 A1 Jan. 22, 2004

(30) Foreign Application Priority Data

Jun. 28, 2000 (NL) .............................................. 1015558

(51) Int. Cl.[7] .................................................. F01D 5/14
(52) U.S. Cl. .................................. 416/223 R; 416/214
(58) Field of Search ................................ 416/214, 186, 416/243, 185, 179, 182, 132 A, 233 R, 237 R, 62, 32, 223 R

(56) References Cited

U.S. PATENT DOCUMENTS

| 2,385,070 | A | * | 9/1945 | Gant ........................... 416/237 |
| 3,044,557 | A | * | 7/1962 | Posh ........................... 416/132 R |
| 3,733,147 | A | * | 5/1973 | Felker ........................ 416/214 R |
| 3,874,816 | A | | 4/1975 | Sweeney et al. |
| 4,003,676 | A | * | 1/1977 | Sweeney et al. ........ 416/132 B |
| 4,412,784 | A | | 11/1983 | Wackerle et al. |
| 4,571,156 | A | | 2/1986 | Penterman |
| 4,618,313 | A | * | 10/1986 | Mosiewicz ................. 416/237 |
| 5,863,182 | A | * | 1/1999 | Hill et al. ................... 416/237 |

FOREIGN PATENT DOCUMENTS

| DE | 196 47 102 | 5/1998 |
| EP | 0 947 693 | 10/1999 |
| GB | 2 068 472 | 8/1981 |
| WO | WO 86 02701 | 5/1986 |

OTHER PUBLICATIONS

R. Gasch, "Windkraftanlagen" 1996, B.G. Teubner Stuttgart, Stuttgart XP002159961 23670 Die Betzsche Optimalauslegung pp 132–135.

* cited by examiner

Primary Examiner—Edward K. Look
Assistant Examiner—James M. McAleenan
(74) Attorney, Agent, or Firm—Young & Thompson

(57) ABSTRACT

A blade of a wind turbine is presented. This blade is provided with a root section for connecting the blade to the shaft or hub of the turbine. The blade also contains a wind-energy-absorbing profile which is optimized for wind flow. The output of the wind turbine is increased by providing the root section with a member that is designed in such a way that the assembly consisting of the member and the root section can absorb wind energy and will increase the overall efficiency of the wind turbine.

16 Claims, 3 Drawing Sheets

BLADE OF A WIND TURBINE

CROSS REFERENCE TO RELATED APPLICATION

This is the 35 U.S.C. §371 national stage of international application PCT/NL01/00483 filed on 28 Jun. 2001, which designated the United States of America.

FIELD OF THE INVENTION

The present invention relates to a blade of a wind turbine, comprising a connection part provided at one end with connection means, for connection to the shaft/hub of a wind turbine, and a wind-energy-absorbing profile which is optimized for the wind flow and extends from the other end of the connection part, the connection part being provided with a member that is designed in such a way that the assembly comprising the member and the connection part can absorb wind energy, which member comprises a rib that projects from the connection part.

BACKGROUND OF THE INVENTION

Such a blade is known from U.S. Pat. No. 3,874,816A, which discloses a rigid blade root end member fitted on the downstream side of the blade. This end member serves mainly to reinforce the blade structures, which in the case of this US patent specification is made of flexible material such as cloth and clamped on the connection part.

In the prior art, where the blade is made of a rigid, non-deformable material, and where the wind-energy-absorbing profile is expensive to produce and is of an elongated design, it is opted to fit a connection part between the wind-energy-absorbing part and the shaft/hub of the wind turbine. On the one hand, the connection part is cheap to produce and, on the other hand, it is designed in such a way that simple connection is possible, large torques being effectively transmitted. Since the torque of the aerodynamic forces increases with decreasing distance from the shaft, and since the surface area passed through by a blade pan decreases—and consequently so does the share in the energy output—with decreasing distance from the shaft, the blade cross section in the direction from tip to connection end acquires an optimization which runs from generally aerodynamic to generally structural. In particular, this connection part will comprise a tube. Since the connection part is situated near the centre of rotation of the wind turbine, the loss that occurs through the cross section not being optimized for the wind flow is less than the costs necessary for making a profile that is optimized for the wind flow, such as that fitted on the other side of the connection part. If the connection part is, for example, a tube, the costs of that tube per metre are many times lower than the costs of the wind-energy-absorbing, wing-like profile fixed on it. In addition, it is simple to connect a tube in a particularly sturdy manner to the remaining part of the structures, by means of, for example, a flange. The term connection part in the description and claims should be understood as meaning that part of a blade that is optimized for the structures, and not so much optimized for the absorption of wind energy. Such a part is characterized by a low natural speed, and it absorbs little in the way of wind forces. In general, it can be said that it does not comprise the part from the free end onwards with increasing chord, but it does comprise the part beyond the maximum chord, in other words the part with decreasing or invariable chord. The connection part can be connected with a separate flange to the aerodynamic wind-energy-absorbing profile.

Such blades are used on a large scale in the prior art.

SUMMARY OF THE INVENTION

It is the object of the present invention to increase the output of such a blade without prohibitively increasing its costs, as would be the case if, for example, the connection part were to be replaced by an extension of the wind-energy-absorbing profile, and to do so without the strength decreasing to an inadmissible extent.

This object is achieved with a blade of the type described above in that said rib is arranged in a plane that forms an angle, which on the pressure side lies between 30° and 150° to the chordal plane of said wind-energy-absorbing profile. More particularly, said angle lies between 45° and 135°.

The term chordal plane should be understood as meaning the plane that is bounded by a series of chords of the wind-energy-absorbing profile. It can be a flat surface. However, the wind-energy-absorbing profile is normally twisted, and this curvature extends from the tip to (a line parallel to) the axis of the rotor. Such a twist can comprise 90° and in practice is generally less than 20°.

If the chordal plane is twisted, this means, of course, that the rib according to the invention likewise does not necessarily have to lie in a flat surface, and is also curved in accordance with the abovementioned requirements.

Moreover, it is possible for the wind-energy-absorbing profile to be rotatable about a longitudinal axis between a feathering position and a most effective position. The abovementioned chordal plane should then be understood as meaning the chordal plane in which the wind-energy-absorbing profile is situated when the turbine is working and there is little wind (5–12 m/s).

According to the invention, the existing connection part is retained in principle unchanged, except that it is provided with a member. According to an advantageous embodiment of the invention, said member can be a simple rib which is fitted on the connection part. Such a rib can be of a slightly curved shape, or it can simply be of a design that extends perpendicular to the connection section. Such a member comprises a rib that extends from the connection part, fitted in an area bounded, on the one hand, by the surface of the wind-energy-absorbing profile in its most effective position and bounded, on the other hand, by the surface clamped down by the rotor shaft and the axis of the wind-energy-absorbing profile, comprising the quadrant lying between the sharp rear edge of the aerodynamic profile and the pressure side of the rotor blade. The term most effective position should be understood as meaning the position in which the most wind energy is absorbed by the profile. Such a position must be distinguished from, for example, the feathering position of a wind-energy-absorbing profile. The position of the rib as described above differs from the structures according to U.S. Pat. No. 3,874,816, in which the rib is fitted in the downstream direction.

In the case of new structures to be produced, the connection part and the member can be made as a unit from fibre reinforced resin. In the case of known structures, if the connection part comprises a circular tube, a strip of material extending from it can be fitted on it, for example by welding or gluing. According to the invention, the height of such a strip is preferably 0.05–0.3 times the (external) diameter or thickness of the connection part. More particularly, the height is approximately 0.1 times the diameter of the connection part.

It has been found that in such a way, particularly in the case of wind turbines with a capacity of more than 50 kW, the output can be increased by 1.5% or more. The costs of fitting such a rib are many times lower than the additional output because such a simple change always pays. It should be pointed out that it is possible to provide existing blades with such a projecting rib, for example during an overhaul.

The rib can be designed in various ways, such as a flat strip, (partially) triangular profile, block profile, sailcloth and the like. Furthermore, the rib may be made flexible or otherwise, since it does not form part of the strength-providing structures of the blade. Forces exerted upon the strip are transmitted to the blade or connection part.

Further optimization of the flow properties of the connection part can be achieved by fitting vortex generators, or by means of air jets which have the same effect. The effect can be produced to a lesser extent also by roughness alone.

BRIEF DESCRIPTION OF THE DRAWINGS

The invention will be explained below with reference to an preferred embodiment illustrated in the drawing, in which.

DETAILED DESCRIPTION OF THE INVENTION

Figure 1:
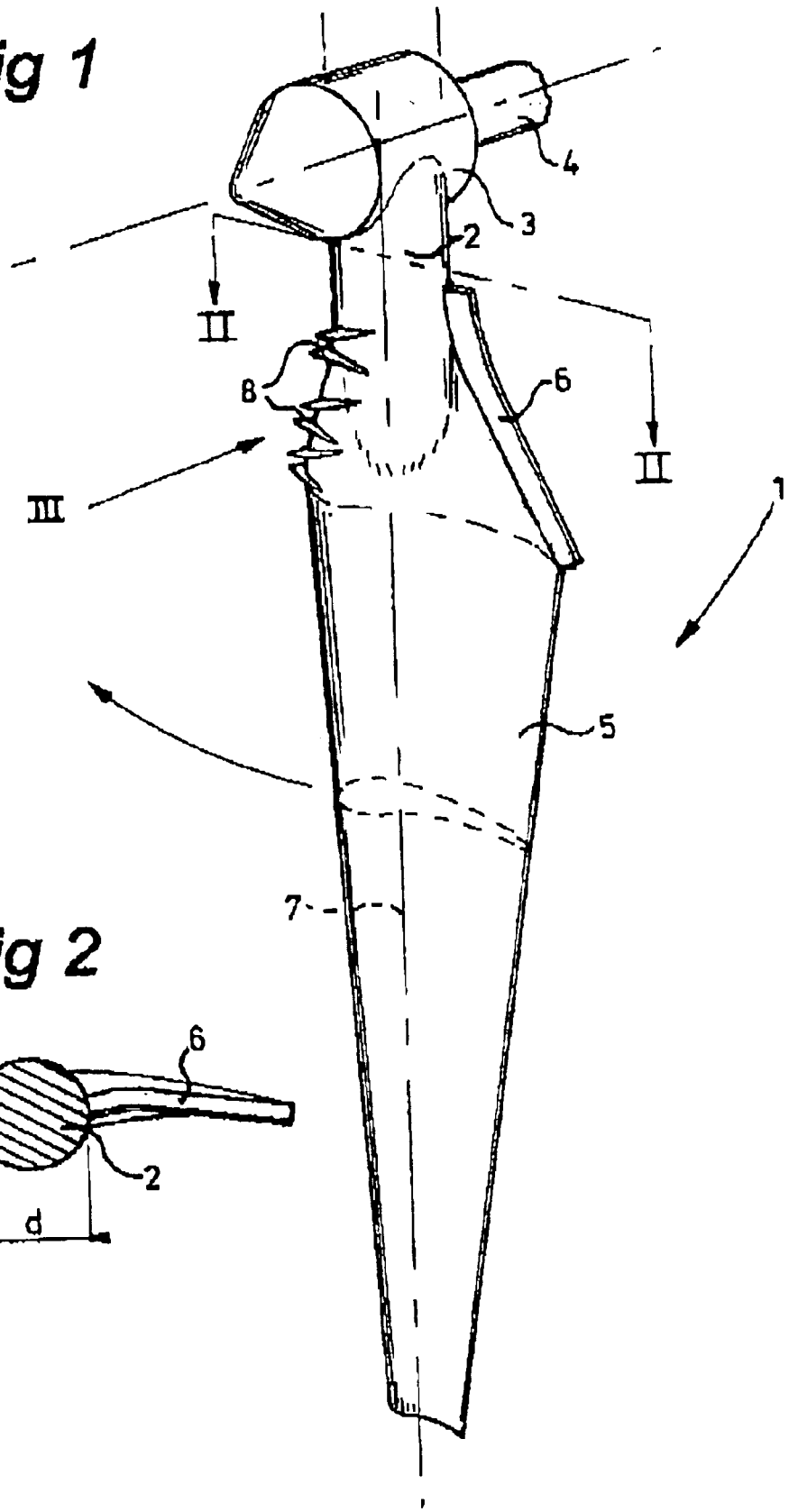
FIG. 1 shows in perspective and diagrammatically a blade of a wind turbine.

In FIG. 1 a blade of a wind turbine according to the invention is illustrated by 1. It is composed of a connection part 2. Connection to a hub 3, which forms part of a shaft 4 behind which the actual generator is connected, is possible by means of a flanged connection (not shown). At the other side, connection part 2 is connected to the wind-energy-absorbing profile 5 of the blade 1. In the embodiment shown, the profile is illustrated as a wing profile, and it will be understood that any other shape can be achieved. The axis of the blade is indicated by 7.

In the example shown here, the connection part 2 is of a circular design and comprises a simple tube. In the general prior art, this tube was of a smooth design, without any further measure being taken.

Figure 2:
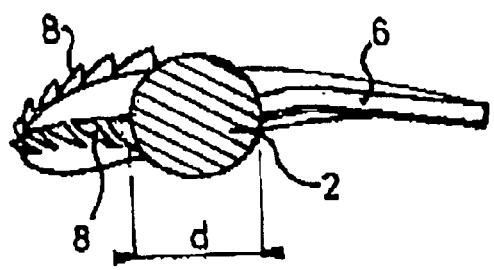
FIG. 2 shows a cross section along the line II—II of FIG. 1.

According to the invention, it is proposed that a member or rib 6 be fitted on the tube 2. It is also proposed that vortex generators 8 be fitted in the position shown. The vortex generators (not drawn to scale) can be punched out of a strip material, the base material being fixed to the connection part 2, for example by means of an adhesive layer. The vortex generators (not drawn to scale) extend perpendicular to the plane of the connection part 2, preferably at an angle of 15° relative to the plane perpendicular to the longitudinal axis 7. The angle can be either positive or negative. The member or the rib 6 according to the invention is shown in detail in FIG. 2. Its height is drawn slightly out of proportion. As a matter of fact, according to the invention it is preferable for said height to be h 0.05–0.3 of the diameter of the cylinder. In particular, said height will be approximately one tenth of the diameter.

Figure 3:
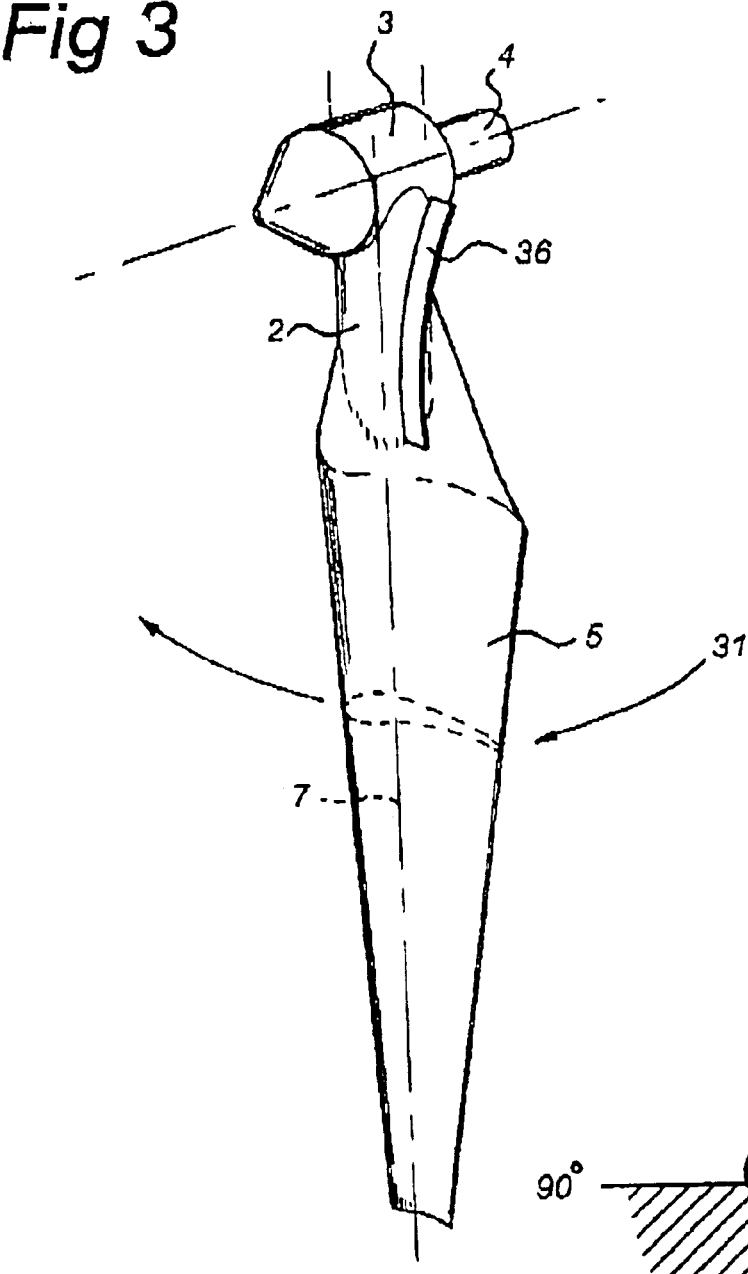
FIG. 3 shows a variant of the structures according to FIG. 1.

FIG. 3 shows a variant of the invention. In this case the blade is shown in its entirety by 31 and the rib by 36. The other parts are unchanged and are provided with the same reference numerals as those in FIG. 1.

It can be seen that the rib extends spirally.

Figure 4:
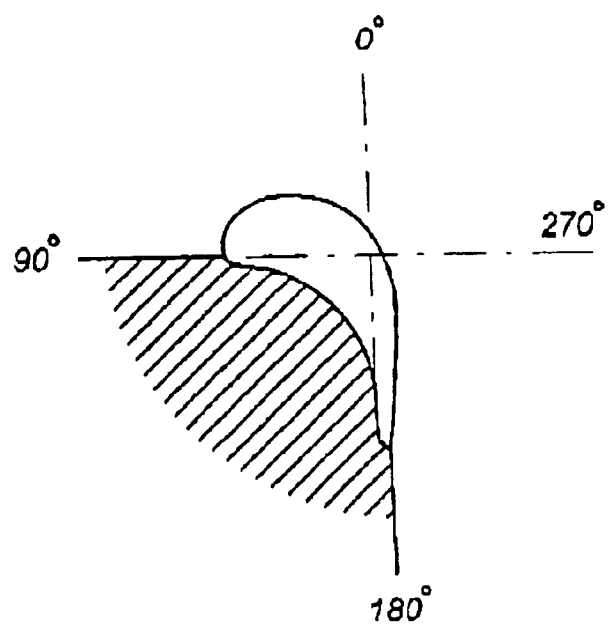
FIG. 4 shows a cross section through a blade, indicating the range in which the rib according to the invention can be fitted.

In FIG. 4 the hatched area shows the range in which the rib can extend. This range refers to the cross section of the blade in situ. In the case of a twisted blade the coordinate axis system will rotate constantly relative to the blade axis.

The rib according to the invention is fitted in the quadrant bounded between the 90 and 180° line.

Figure 5:
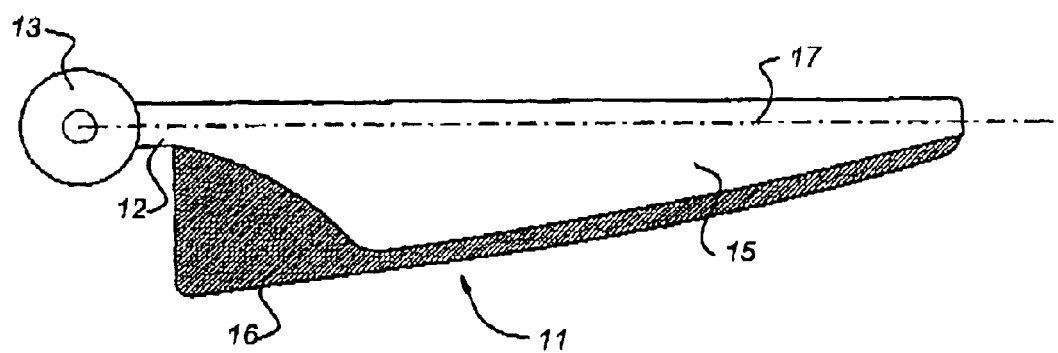
FIG. 5 shows in a front view a first alternative of the structures according to the invention.
Figure 6:
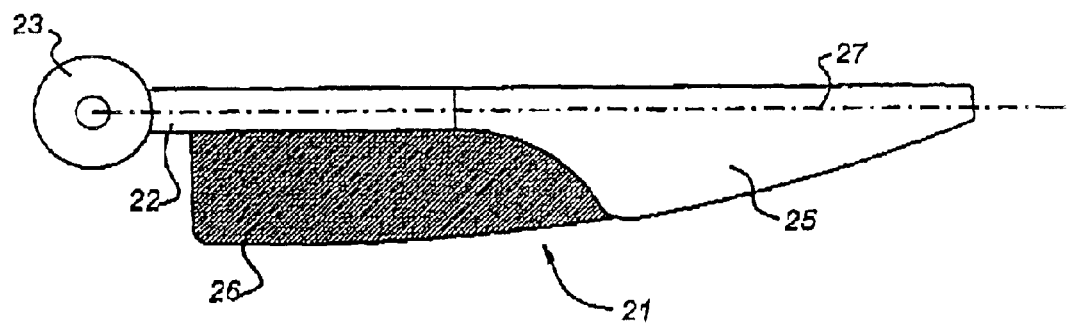
FIG. 6 shows a second variant.

Further variants of the invention are shown in FIGS. 5 and 6. In FIG. 5 a blade of a wind turbine is indicated by 11. It consists of a connection part. Reference numeral 17 indicates the axis of the blade, while the wind-energy-absorbing profile is indicated by 15. The part according to the invention is indicated by 16. As in the case of the previous embodiment and that to be discussed below, said part can be flexible or even controllable.

A further embodiment is shown in FIG. 6 and is indicated in its entirety by 21. The hub is indicated by 23, while 27 indicates the axis of the blade. The wind-absorbing part is indicated by 25, and the connection part by 22. The part according to the invention is indicated by 26.

With reference to FIG. 4, an example will be given below of a rib that extends spirally around the connection part. The 90–270° line corresponds to the rotor shaft. The coordinates system here is fixed relative to the blade axis and does not rotate with the blade twist. At 5% of the total length of the blade, the position of the rib is 158°. At 10% of the total length of the blade, the position is 122°, and at 30% of the length of the blade it is 103°.

It must be understood that this relates only to an example, and that considerable modifications are possible within the range hatched in FIG. 4. Deviations up to 30% relative to this preferred position are possible.

Although the invention has been described above with reference to a preferred embodiment, it should be understood that numerous modifications are possible. For instance, the member 6 can extend over only a limited part of the height of the connection part 2, and the connection part 2 can have a shape that deviates from the circular shape. Such modifications are obvious to persons skilled in the art after reading the above description, and lie within the scope of the appended claims.

What is claimed is:

1. A blade of a wind turbine, comprising:
    a cylindrical connection part;
    a connection means, provided at one end of the cylindrical connection part, for connection of the cylindrical connection part to a shaft/hub of a wind turbine,
    the cylindrical connection part having a wind-energy-absorbing profile which is optimized for wind flow and extends from another end of the connection part;
    the connection part being provided with a member that is designed in such a way that an assembly comprising the member and the connection part can absorb wind energy;
    said member comprising a rib that projects from the cylindrical connection part;
    said rib being arranged in a plane that forms an angle, which on the pressure side lies between 45° and 135° to the chordal plane of said wind-energy-absorbing profile.

2. The blade according to claim 1, in which said rib is fitted in a plane that forms an angle of approximately 90° to the chordal plane of said wind-energy-absorbing profile.

3. The blade according to claim 1, in which said connection part comprises a substantially circular cross section and said rib projects from the cross section.

4. The blade according to claim 1, wherein said connection part comprises a transition from a circular to an aerodynamic profile.

5. The blade according to claim 1, wherein the height of the rib lies between 0.05 and 0.3 times the diameter or thickness of the connection part.

6. The blade according to claim 1, wherein the connection part is provided with vortex-producing generators.

7. The blade according to claim 1, designed as a flexible part.

8. The blade of claim 1, wherein the rib extends spirally from the cylindrical connection part.

9. The blade of claim 1, wherein, the cylindrical connection part comprises a tube.

10. The blade of claim 1, wherein, the cylindrical connection part comprises a tube, and the rib projects from the tube.

11. The blade of claim 10, further comprising: vortex generators fitted on the tube.

12. The blade of claim 11, wherein, the vortex generators extend perpendicular to a plane of the tube.

13. The blade of claim 12, wherein the vortex generators extend at an angle of 15° relative to a plane perpendicular to a longitudinal axis of the blade.

14. The blade of claim 1, wherein the rib extends from the cylindrical connection part and from the wind-energy-absorbing profile.

15. Method for producing a blade of a wind turbine, comprising:

providing a blade comprising a cylindrical connection part provided at one end with connection means for connection to a shaft/hub of a wind turbine, and a wind-energy-absorbing profile at another end;

providing a rib on the cylindrical connection part in such a way that an assembly comprising the rib and the cylindrical connection part can generate wind energy;

said rib being arranged in a plane which on the pressure side lies between 45° and 135° to the chordal plane of the wind-energy-absorbing profile.

16. A blade of a wind turbine, comprising:

a connection part provided at one end with a connection means for connection to a shaft/hub of a wind turbine, and a wind-energy-absorbing profile which is optimized for wind flow and extends from another end of the connection part;

the connection part being provided with a member that is designed in such a way that an assembly comprising the member and the connection part can absorb wind energy;

said member comprising a rib that projects from the connection part;

said rib being arranged in a plane that forms an angle, which on the pressure side lies between 45° and 135° to the chordal plane of said wind-energy-absorbing profile, wherein the height of the rib lies between 0.05 and 0.3 times the diameter or thickness of the connection part.

* * * * *